United States Patent
Chakra et al.

(10) Patent No.: US 11,282,537 B2
(45) Date of Patent: Mar. 22, 2022

(54) ACTIVE SPEAKER DETECTION IN ELECTRONIC MEETINGS FOR PROVIDING VIDEO FROM ONE DEVICE TO PLURALITY OF OTHER DEVICES

(71) Applicant: International Business Machines Corporation, Armonk, NY (US)

(72) Inventors: Al Chakra, Apex, NC (US); Jonathan Dunne, Dungarvan (IE); James P. Galvin, Jr., Georgetown, KY (US); Liam Harpur, Skerries (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 651 days.

(21) Appl. No.: 15/618,607

(22) Filed: Jun. 9, 2017

(65) Prior Publication Data
US 2018/0358034 A1    Dec. 13, 2018

(51) Int. Cl.
| | | |
|---|---|---|
| *G10L 25/78* | (2013.01) | |
| *G10L 15/32* | (2013.01) | |
| *G10L 15/22* | (2006.01) | |
| *G06F 3/16* | (2006.01) | |
| *H04N 7/14* | (2006.01) | |
| *H04N 7/15* | (2006.01) | |
| *H04M 3/56* | (2006.01) | |

(52) U.S. Cl.
CPC .............. *G10L 25/78* (2013.01); *G06F 3/165* (2013.01); *H04M 3/569* (2013.01); *H04N 7/147* (2013.01); *H04N 7/15* (2013.01); *H04M 3/568* (2013.01)

(58) Field of Classification Search
CPC .............. H04L 12/1831; H04M 3/568; G06K 9/00711; G10L 15/32
USPC ........................... 704/9; 379/88.02; 382/305
See application file for complete search history.

(56) References Cited

U.S. PATENT DOCUMENTS

| | | | | |
|---|---|---|---|---|
| 7,606,444 B1 * | 10/2009 | Erol | ................... | G06K 9/00711 |
| | | | | 382/305 |
| 8,878,678 B2 | 11/2014 | Liu | | |
| 8,947,493 B2 | 2/2015 | Lian et al. | | |
| 9,065,971 B2 | 6/2015 | Verthein et al. | | |

(Continued)

OTHER PUBLICATIONS

Kheradiya, J. et al., "Active Speaker Detection Using Audio-Visual Sensor Array," In 2014 IEEE Int'l. Sym. on Signal Processing and Information Technology (ISSPIT), Dec. 15-17, 2014, pp. 000480-000484 [Abstract only].

(Continued)

*Primary Examiner* — Farzad Kazeminezhad
(74) *Attorney, Agent, or Firm* — Cuenot, Forsythe & Kim, LLC (57) ABSTRACT

Active speaker detection can include receiving speaker detection signals from a plurality of devices participating in an electronic meeting. Each speaker detection signal specifies a score indicating whether an active speaker is detected by a respective device of the plurality of devices that generates the speaker detection signal. Active speaker detection further can include determining, using a processor, a device of the plurality of devices that detects an active speaker based upon the speaker detection signals, wherein, in response to the determining, the method further comprises: providing video received from the determined device to the plurality of devices during the electronic meeting.

17 Claims, 3 Drawing Sheets

(56) References Cited

U.S. PATENT DOCUMENTS

| | | | |
|---|---|---|---|
| 9,210,269 B2 | 12/2015 | Liu et al. | |
| 9,215,543 B2 | 12/2015 | Sun et al. | |
| 9,386,147 B2 | 7/2016 | McDysan et al. | |
| 9,451,360 B2 | 9/2016 | Bao et al. | |
| 2009/0253418 A1 | 10/2009 | Makinen | |
| 2013/0144603 A1* | 6/2013 | Lord | H04L 12/1831 |
| | | | 704/9 |
| 2015/0334497 A1 | 11/2015 | VanBlon et al. | |
| 2016/0182727 A1* | 6/2016 | Baran | H04M 3/568 |
| | | | 379/88.02 |
| 2017/0025124 A1* | 1/2017 | Mixter | G10L 15/32 |

OTHER PUBLICATIONS

"Computer Vision," [online] Wikipedia, the Free Encyclopedia, Feb. 3, 2017 [retrieved Feb. 7, 2017], retrieved from the Internet: <https://en.wikipedia.org/w/index.php?title=Computer_vision&oldid=763417482>, 11 pg.

* cited by examiner

ACTIVE SPEAKER DETECTION IN ELECTRONIC MEETINGS FOR PROVIDING VIDEO FROM ONE DEVICE TO PLURALITY OF OTHER DEVICES

BACKGROUND

This disclosure relates to detecting active speakers within an electronic meeting. Examples of electronic meetings include teleconferences, videoconferences, and Web-based meetings. For a variety of different reasons, the audio from one or more of the participants in the electronic meeting may be muted. For example, when a participant is only listening to the meeting, muting the audio of the participant's device helps to reduce the amount of noise heard in the electronic meeting thereby allowing the participants to hear the active speaker more clearly.

In another example, multiple participants may decide to get together in a conference room to join the electronic meeting. Though physically co-located in the same room, each participant typically joins the electronic meeting using a different device. As such, each participant in the conference room may connect to the electronic meeting through his or her own laptop, tablet, or other suitable communication device. In that case, muting audio of devices helps to reduce audio artifacts such as echo and/or feedback.

SUMMARY

One or more embodiments are directed to methods for active speaker detection. In one aspect, a method can include receiving speaker detection signals from a plurality of devices participating in an electronic meeting, wherein each speaker detection signal specifies a score indicating whether an active speaker is detected by a respective device of the plurality of devices that generates the speaker detection signal. The method can also include determining, using a processor, a device of the plurality of devices that detects an active speaker based upon the speaker detection signals.

One or more embodiments are directed to systems for active speaker detection. In one aspect, a system includes a memory configured to store program code and a processor coupled to the memory, wherein the processor, in response to executing the program code, is configured to initiate operations. The operations can include receiving speaker detection signals from a plurality of devices participating in an electronic meeting, wherein each speaker detection signal specifies a score indicating whether an active speaker is detected by a respective device of the plurality of devices that generates the speaker detection signal. The operations can also include determining a device of the plurality of devices that detects an active speaker based upon the speaker detection signals.

One or more embodiments are directed to a computer program product for active speaker detection. In one aspect, the computer program product includes a computer readable storage medium having program code stored thereon. The program code is executable by a processor to cause the processor to initiate operations including receiving speaker detection signals from a plurality of devices participating in an electronic meeting, wherein each speaker detection signal specifies a score indicating whether an active speaker is detected by a respective device of the plurality of devices that generates the speaker detection signal. The operations can also include determining a device of the plurality of devices that detects an active speaker based upon the speaker detection signals.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to detecting active speakers within an electronic meeting. More particularly, this disclosure relates to active speaker detection when one or more devices participating in the electronic meeting (e.g., the microphones thereof) are placed on mute. In one or more embodiments, an electronic meeting system is capable of receiving speaker detection signals from devices that are participating in an electronic meeting. The devices are capable of sending the speaker detection signals when not muted and/or when placed on mute. In an example, each device participating in the electronic meeting is capable of sending a speaker detection signal. The speaker detection signal may be separate from the audio, video, and/or audiovisual signals provided to the electronic meeting system.

The electronic meting system is capable of receiving the speaker detection signals from the devices participating in the electronic meeting. Based upon the received speaker detection signals, the electronic meeting system is capable of determining which one(s) of the devices have detected an active speaker. The electronic meeting system is capable of determining which devices have detected an active speaker regardless of whether the device(s) have been muted and/or are not providing audio data to the meeting system.

In one or more embodiments, the electronic meeting system is a videoconferencing system. In that case, the electronic meeting system is capable of determining which participants remain visible based upon the active speaker determinations made using the speaker detection signals. For example, in response to the speaker detection signals, the electronic meeting system is capable of adjusting or adapting the video that is distributed to the devices participating in the electronic meeting to show the participants determined to be the active speaker(s).

Often, videoconferencing systems are constrained as to the number of participants that may be displayed at one time. For example, a video conferencing system may be able to display 4, 6, or 8 different participants (e.g., video feeds of different participants) concurrently despite many more (e.g., tens or hundreds) people participating in the electronic meeting. As such, videoconferencing systems must choose the participants that are displayed during the electronic meeting. Conventional videoconferencing systems typically rely upon audio energy received from the devices participating in the electronic meeting to identify the active speaker. The conventional videoconferencing systems make or keep the active speaker visible during the meeting based upon the audio energy received from the participating devices.

In cases where the audio, e.g., a microphone, of a device participating in the meeting is placed on mute, the electronic meeting system is unable to detect any audio energy from the device. In other cases, a participant may join an audio conferencing system that provides teleconferencing (e.g., audio) for the videoconference rather than joining the audio of the videoconferencing system. As such, the videoconferencing system does not receive an audio stream from the participant to analyze. In cases such as these, the electronic meeting system is unable to determine whether the participant is or has become the active speaker to display the participant in the electronic meeting.

In accordance with the inventive arrangements described herein, an electronic meeting system is capable of determining that a selected participant is an active speaker during the videoconference even though the device of the selected participant is muted or audio for the participant is unavailable. The electronic meeting system is capable of causing the video received from the device of the selected participant to be distributed to the other devices participating in the electronic meeting or otherwise keeping the selected participant visible to participants of the electronic meeting.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
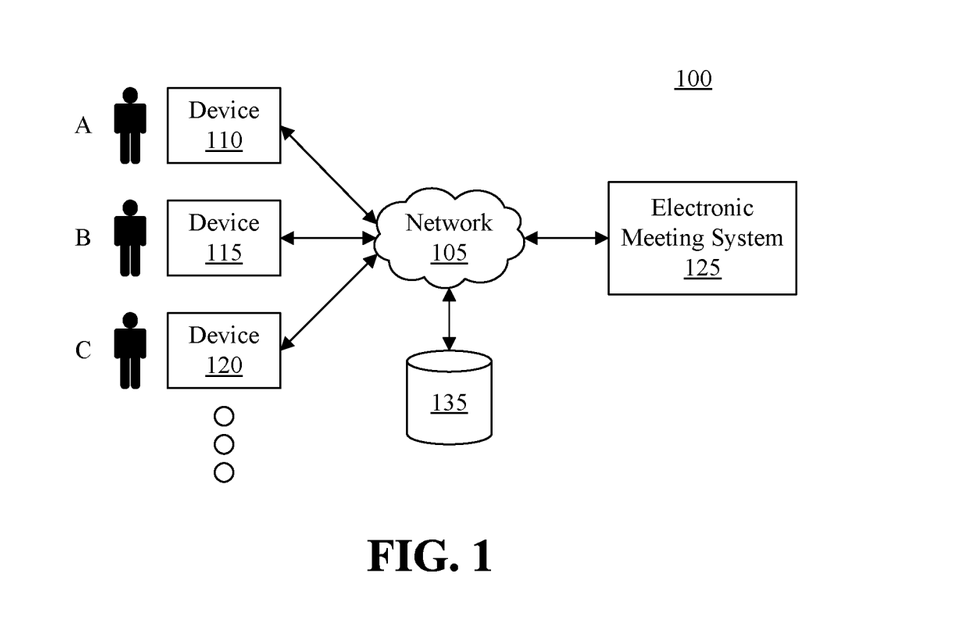
FIG. 1 illustrates an example of a network computing system.

FIG. 1 illustrates an example of a network computing system 100 in which the inventive arrangements may be implemented. Network computing system 100 contains a network 105, devices 110, 115, and 120, an electronic meeting system (meeting system) 125, and an optional data storage device 135. The noted elements are interconnected, e.g., communicatively linked, by network 105.

Network 105 is the medium used to provide communication links between various devices and data processing systems connected together within network computing system 100. Network 105 may include connections, such as wired communication links, wireless communication links, or fiber optic cables. Network 105 may be implemented as, or include, one or more or any combination of different communication technologies such as a Wide Area Network (WAN), a Local Area Network (LAN), a wireless network (e.g., a wireless WAN and/or a wireless LAN), a mobile or cellular network, a Virtual Private Network (VPN), the Internet, the Public Switched Telephone Network (PSTN), and so forth.

Devices 110, 115, and 120 are capable of coupling to network 105 via wired and/or wireless communication links. Devices 110, 115, and/or 120 may be implemented as personal computers, portable computing or communication devices, network computers, tablet computers, mobile phones, or the like. Further, device 110 may be implemented as one type of device, while device 115 is implemented as another different type of device, while device 120 is implemented as yet another different type of device. Devices 110, 115, and 120 are capable of executing suitable operational software to support the various operations described herein. Devices 110, 115, and 120 are capable of joining electronic meetings (meetings) hosted by meeting system 125. Devices 110, 115, and 120 are capable of communicating with one another when joined in a meeting hosted by meeting system 125.

The term "electronic meeting" or "meeting" refers to any of a variety of communication sessions hosted by meeting system 125 that two or more devices are able to join. The meeting allows the devices participating therein to communicate by exchanging audio, video, files, perform desktop and/or application sharing, messaging/texting, or any combination thereof within the meeting. Examples of meetings include, but are not limited to, Web-based meetings, teleconferences, and videoconferences.

Meeting system 125 is capable of coupling to network 105 via wired and/or wireless communication links. In one aspect, meeting system 125 is implemented as one or more interconnected computer systems, e.g., servers. Meeting system 125 is capable of executing suitable operational software to support the various operations described herein. In one embodiment, meeting system 125 is capable of hosting a meeting joined by a plurality of devices such as devices 110-120. For example, meeting system 125 is capable of receiving communications such as audio (e.g., voice), video, or other data from devices 110, 115, and 120 during a meeting. Meeting system 125 is capable of mixing the data and distributing the communications among the devices to facilitate the meeting. For example, meeting system 125 is capable of combining audio received from devices 110-120 and distributing the combined audio to devices 110-120. Meeting system 125 is capable of distributing video from one or more of devices 110-120, e.g., the device(s) determined to have an active speaker, to devices 110-120.

Data storage device 135 is capable of coupling to network 105 via wired and/or wireless communication links. Data storage device 135 may be implemented as a data processing system such as a server, as a network addressable storage device or node, etc.

As discussed, devices 110-120 are capable of sending and receiving a variety of different types of data. For purposes of discussion, audio data and/or video data are referred to as audiovisual data. In one or more embodiments, devices 110-120 are capable of sending additional data to meeting system 125. For example, devices 110-120 are capable of sending speaker detection signals. In an aspect, the speaker detection signal is independent of the audiovisual data provided or sent by a device. In one example, the speaker detection signal may be an additional channel, e.g., a side channel, between a device participating in a meeting and meeting system 125. In another example, the speaker detection signal may be an out of band signal between a device participating in a meeting and meeting system 125.

Devices 110-120 are capable of sending the speaker detection signal continuously and/or periodically. In an aspect, the speaker detection signal specifies a score. The score indicates whether an active speaker is detected by the device generating the speaker detection signal. In this regard, the speaker detection signal does not carry or convey audio data or video data. Rather, the speaker detection signal specifies a score that is indicative of whether the device providing the speaker detection signal has detected an active speaker (e.g., detected audio, a human voice, human speech, and/or a particular user's voice). Each of devices 110-120 is capable of sending a speaker detection signal independently of whether the device is muted. For example, device 110 may not be muted, while devices 115 and 120 are muted. Each of devices 110-120 sends a respective speaker detection signal that is received by meeting system 125.

In particular embodiments, one or more or all of devices 110-120 are capable of detecting audio. For example, one or more or all of devices 110-120 are capable of detecting audio energy (e.g., amplitude) that is greater than a predetermined level. In response to detecting audio that is louder than a predetermined threshold, the device(s) are capable of generating a speaker detection signal indicating that an active speaker is detected.

In another example, devices 110-120 are capable of generating speaker detection signals based upon the bitrate of the audio encoder included in the device. For example, in response to detecting a bitrate of 0 or a bitrate that does not exceed a predetermined bitrate from the audio encoder, the device is capable of generating a speaker detection signal indicating that no active speaker is detected. In response to detecting a non-zero bitrate or a bitrate above a predetermined minimum bitrate, the device is capable of generating a speaker detection signal indicating that an active speaker is detected.

In particular embodiments, one or more or all of devices 110-120 are capable of performing additional audio analysis on received audio to determine whether the audio includes a human voice. For example, the device(s) are capable of performing voice activity detection (VAD) or speech detection to detect the presence of human speech in received audio. In that case, the device(s) are capable of generating a speaker detection signal to indicate that an active speaker is detected in response to detecting human speech as opposed to detecting audio, in general, of a minimum energy level.

In particular embodiments, one or more or all of devices 110-120 are capable of performing audio analysis to identify whether a detected voice is that of a particular user or participant. For example, the devices 110-120 may be capable of performing speaker and/or voice identification. Each device may store a voice profile of a user of the device and, in response to receiving audio that is determined to be human speech, compare the received audio to the voice profile. The device is capable of determining whether the received human speech is that of the user, e.g., a particular user, of the device based upon whether the human speech matches the voice profile. In response to determining that the received audio is human speech from the particular user (e.g., the user of the device), the device(s) are capable of generating a speaker detection signal indicating that an active speaker is detected.

In particular embodiments, one or more or all of devices 110-120 are capable of performing speech to text and determining, through semantic analysis and/or natural language processing (NLP), whether the detected human speech is related to the meeting. For example, the device(s) can determine whether words identified in the received speech are related to words and/or the subject matter of the meeting. In response to detecting human speech that is determined to be related to the subject matter of the meeting, the device(s) are capable of generating a speaker detection signal indicating that an active speaker is detected.

NLP is a field of computer science, artificial intelligence, and linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. As part of NLP, semantic analysis may be performed. Semantic analysis may follow parsing and involve extraction of context-independent aspects of a sentence's meaning, including entities, named entities, the semantic roles of entities mentioned in the sentence, and quantification information, such as cardinality, iteration, and dependency.

In particular embodiments, one or more or all of devices 110-120 are capable of performing image processing. For example, a device is capable of determining whether a user is in frame of a camera of the device by performing facial recognition and/or analysis. A device may also perform feature extraction to determine whether the mouth and/or lips of the participant are moving. The video analysis may be performed in lieu of or in combination with any one or more of the different forms of audio detection and/or analysis described above (including semantic analysis). As an illustrative example, a device detecting moving lips and/or a moving mouth of a participant from video in combination and concurrently with detecting audio, human speech, and/or content relating to the meeting, is capable of generating a speaker detection signal indicating detection of an active speaker. As another illustrative example, a device detecting moving lips and/or a moving mouth of a participant from video alone is capable of generating a speaker detection signal indicating detection of an active speaker.

It should be appreciated that devices 110-120 may use one or more or any combination of the foregoing techniques for detecting an active speaker during a meeting. As discussed, the speaker detection signal generated by each of devices 110-120 specifies a score indicating whether an active speaker is detected. In one or more embodiments, the score is a binary value such as a Boolean flag. For example, a "0" indicates that no active speaker is detected. A "1" indicates that an active speaker is detected. In one or more embodiments, the speaker detection signal specifies a score that expresses a likelihood or probability that an active speaker is detected. For example, the score may be a value between 0 and 1.

In particular embodiments, devices 110-120 are capable of using an expression that weights the various parameters detected to create a weighted sum. For example, one or more of the parameters determined from detecting audio energy, human voice detection, voice identification, semantic analysis, and/or image processing may be multiplied by a weighting factor and summed. The weighted sum may be used as the score and provided to meeting system 125 as the speaker detection signal. In that case, for example, meeting system 125 is capable of interpreting the received speaker detection signal and score specified therein to determine whether any given device has detected an active speaker.

In one or more embodiments, the devices may be configured to compare the weighted sum to a threshold. If the weighted sum exceeds the threshold, the device may send a Boolean flag such as "1" as the speaker detection signal indicating that an active speaker has been detected. If the weighted sum does not exceed the threshold, the device sends a Boolean value of "0" as the speaker detection signal indicating that no active speaker is detected.

Meeting system 125 is capable of receiving the speaker detection signals from devices 110-120. In one or more embodiments, meeting system 125 analyzes the received speaker detection signals. Based upon the score specified by each respective speaker detection signal, meeting system 125 is capable of determining which of devices 110-120 have detected an active speaker.

In particular embodiments, meeting system 125 is capable of automatically muting or un-muting audio from devices 110, 115 and/or 120 based upon the speaker detection signals. For example, meeting system 125 is capable of un-muting a device indicating, by way of the speaker detection signal, that an active speaker is detected. In another example, meeting system 125 is capable of muting a device indicating, by way of the speaker detection signal, that no active speaker is detected. In another example, meeting system 125 is capable of sending a notification to a device indicating, by way of the speaker detection signal, that an active speaker is detected that the device should be un-muted. In another example, meeting system 125 is capable of sending a notification to a device indicating, by way of the speaker detection signal, that no active speaker is detected that the device should be muted.

In particular embodiments, meeting system 125 is capable of selecting video received from devices 110, 115, and/or 120 to be displayed during the meeting. For example, meeting system 125 is capable of determining which of participants A, B, and/or C is an active speaker during a meeting based upon the received speaker detection signals from devices 110, 115, and/or 120, respectively. In response to determining which of participants A, B, and/or C is an active speaker, meeting system 125 is capable of displaying the video for that participant within the meeting. In this way, meeting system 125 is capable of ensuring that video for the active speaker is displayed throughout a given meeting.

FIG. 1 is provided for purposes of illustration and is not intended to limit the inventive arrangements described herein. It should be appreciated that network computing system 100 may include fewer elements than shown or more elements than shown. For example, network computing system 100 may include fewer or more servers, clients, and other devices participating in the meeting. In addition, one or more of the elements illustrated in network computing system 100 may be merged or combined. For example, data storage device 135 may be included within meeting system 125.

Figure 2:
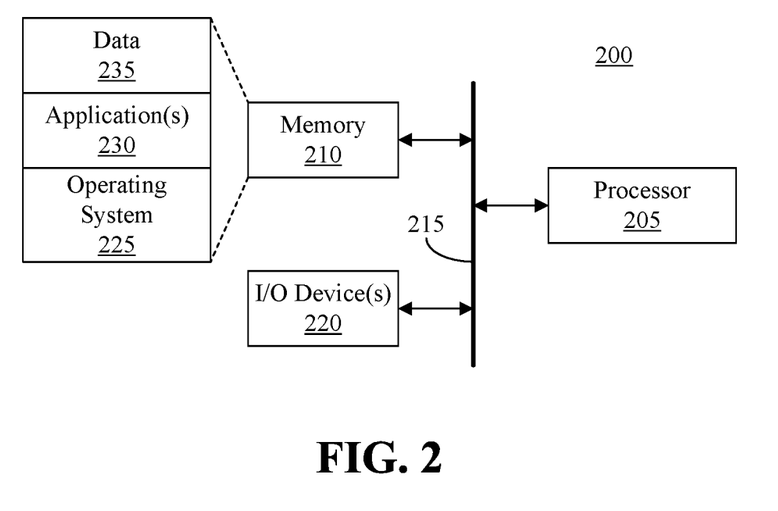
FIG. 2 illustrates an example of a data processing system.

FIG. 2 illustrates an example of a data processing system (system) 200 for use with one or more embodiments described herein. In an aspect, system 200 is implemented as a computer or other system or device that is suitable for storing and/or executing program code. In particular embodiments, system 200 illustrates an example of meeting system 125 of FIG. 1.

System 200 includes at least one processor 205, e.g., a central processing unit (CPU). Processor 205 is coupled to memory 210 through interface circuitry 215. System 200 stores computer readable instructions (also referred to as "program code") within memory 210. Memory 210 is an example of computer readable storage media. Processor 205 executes the program code accessed from memory 210 via interface circuitry 215.

Memory 210 includes one or more physical memory devices such as, for example, a local memory and one or more bulk storage devices. The term "local memory" refers to non-persistent memory device(s) generally used during actual execution of the program code. An example of local memory is random access memory (RAM) and/or any of the various types of RAM that are suitable for use as local memory. The term "bulk storage device" refers to persistent data storage devices. Examples of a bulk storage device include a hard disk drive (HDD) and a solid state drive (SSD). System 200 may also include one or more cache memories (not shown) that provide temporary storage of at least some program code in order to reduce the number of times program code must be retrieved from a bulk storage device during execution.

Examples of interface circuitry 215 include, but are not limited to, an input/output (I/O) subsystem, an I/O interface, a bus system, and a memory interface. For example, interface circuitry 215 may be one or more of any of several types of bus structures, including a memory bus or memory controller, a peripheral bus, an accelerated graphics port, and a processor or local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

System 200 further may include one or more input/output (I/O) devices 220 coupled to interface circuitry 215. I/O devices 220 may be coupled to system 200, e.g., interface circuitry 215, either directly or through intervening I/O controllers. Examples of I/O devices 220 include, but are not limited to, a keyboard, a display device, a pointing device, an audio subsystem (e.g., microphone(s) and/or speaker(s)), a video subsystem (e.g., a camera), one or more communication ports, a network adapter, etc. A network adapter refers to circuitry that enables system 200 to become coupled to other systems, computer systems, remote printers, and/or remote storage devices through intervening private or public networks. Modems, cable modems, Ethernet cards, and wireless transceivers are examples of different types of network adapters that may be used with system 200.

Memory 210 stores one or more program modules. The program modules may generally include routines, programs, objects, components, logic, data structures, and so on. For purposes of illustration, memory 210 stores an operating system 225, one or more application(s) 230, and data 235. In an aspect, operating system 225 and application(s) 230, being implemented in the form of executable program code, are executed by system 200 and, more particularly, by processor 205, to perform the operations described within this disclosure. As such, operating system 225 and application(s) 230 may be considered an integrated part of system 200. Further, it should be appreciated that any data used, generated, and/or operated upon by system 200 (e.g., processor 205) are functional data structures that impart functionality when employed as part of the system.

System 200 may include fewer components than shown or additional components not illustrated in FIG. 2 depending upon the particular type of device and/or system that is implemented. Further, one or more of the illustrative components may be incorporated into, or otherwise form a portion of, another component. For example, a processor may include at least some memory.

In addition, the particular operating system, application(s), and/or I/O devices included may vary according to the type of device or system implemented. As an illustrative and non-limiting example, one or more or all of devices 110-120 of FIG. 1 may be implemented using a system as described in connection with FIG. 2. In that case, the particular operating system and/or applications included will vary from that of a system implementation of meeting system 125. Further, in implementing device(s) 110, 115, and/or 120, system 200 will include an audio subsystem and/or a video subsystem.

Figure 3:
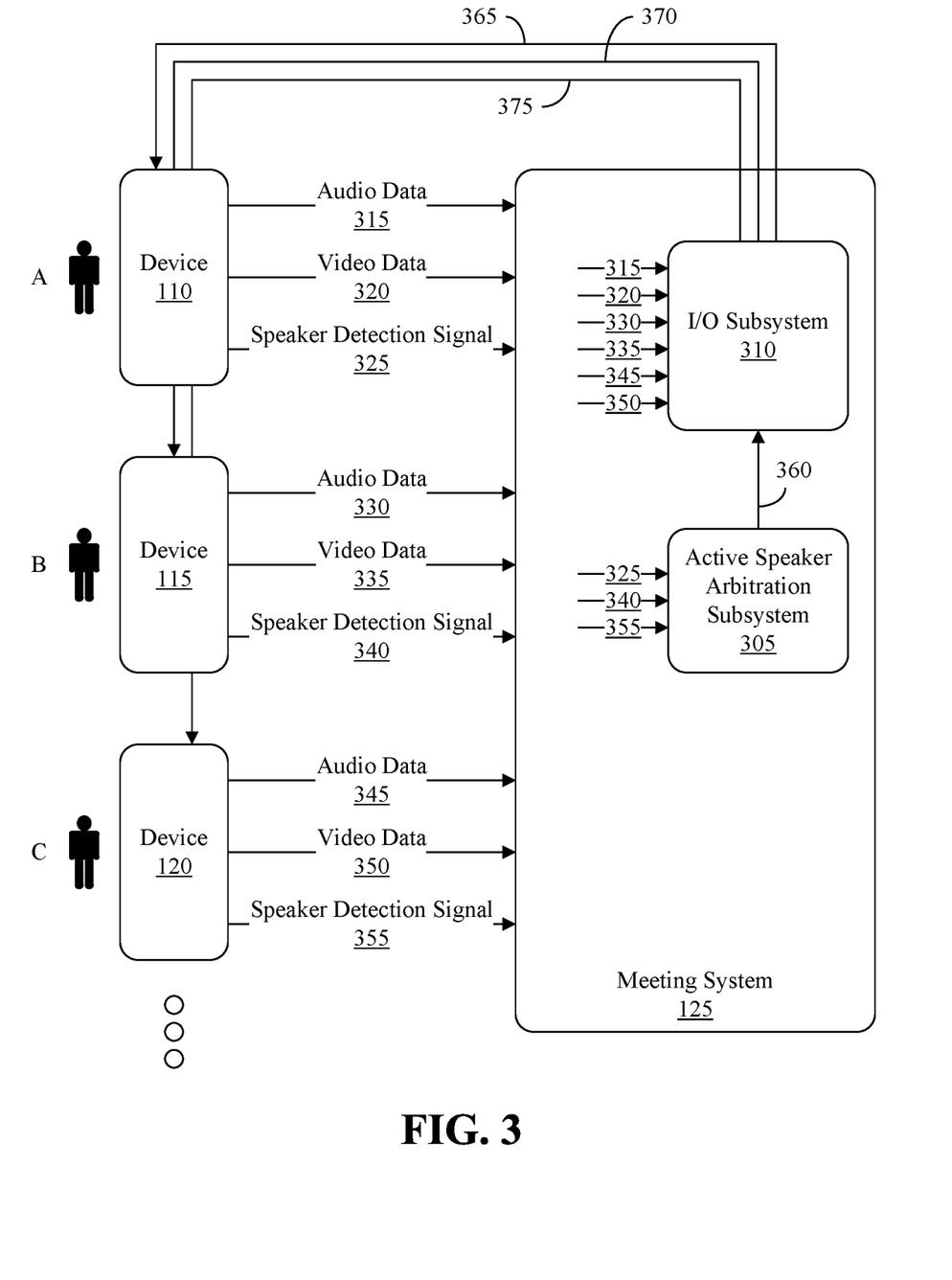
FIG. 3 illustrates an example implementation of an electronic meeting system.

FIG. 3 illustrates an example implementation of meeting system 125 of FIG. 1. In the example of FIG. 3, meeting system 125 includes an active speaker arbitration subsystem (arbitration subsystem) 305 and an input/output (I/O) subsystem 310. Devices 110, 115, and 120 are participating in a meeting hosted by meeting system 125.

Device 110 is capable of sending audio data 315, video data 320, and speaker detection signal 325 to meeting system 125. Device 115 is capable of sending audio data 330, video data 335, and speaker detection signal 340 to meeting system 125. Device 120 is capable of sending audio data 345, video data 350, and speaker detection signal 355 to meeting system 125. Each of devices 110-120 is capable of generating and sending speaker detection signals 325, 340, and 355 whether muted or un-muted.

Audio data and/or video data may be sent to meeting system 125 and/or received from meeting system 125 using a suitable communications protocol. For example, audio data and/or video data may be sent and/or received using real-time protocol (RTP) as a data stream or streams. In some cases, when a device is muted, the device may not send audio data and/or video data. For example, the device may send no audio data, e.g., a zero bitrate data stream. In other cases, the device may send audio data that encodes silence or comfort noise.

In the example of FIG. 3, I/O subsystem 310 is capable of receiving audio data and/or video from devices participating in the meeting. As pictured, I/O subsystem 310 receives audio data 315, video data 320, audio data 330, video data 335, audio data 345, and video data 350. Arbitration subsystem 305 is capable of receiving speaker detection signals from devices participating in the meeting. Accordingly, as pictured, arbitration subsystem 305 receives speaker detection signal 325, speaker detection signal 340, and speaker detection signal 355.

Arbitration subsystem 305 is capable of determining which of participants A, B, and/or C is speaking, e.g., is an active speaker, based upon speaker detection signals 325, 340, and/or 355 from devices 110, 115, and 120, respectively. In one or more embodiments, arbitration subsystem 305 provides an active speaker signal 360 to I/O subsystem 310. Active speaker signal 360 indicates which ones of devices 110, 115, and/or 120 participating in the meeting has/have detected an active speaker. In particular embodiments, speaker detection signals 325, 340, and 355 indicate active speaker detection in real time and/or substantially real time. Similarly, active speaker signal 360 specifies which ones of devices 110, 115 and/or 120 has/have detected an active speaker in real time and/or substantially real time.

I/O subsystem 310 is capable of mixing or combining the various audio and/or video data received to generate audio and/or video output data that is provided or distributed to devices 110-120 via signals 365, 370, and 375. The video output data, for example, includes video data received from particular ones of devices 110-120 having detected an active speaker as determined from speaker detection signals 325, 340, and 355, and as specified by active speaker signal 360.

For purposes of illustration, consider an example where device 110 and device 115 are co-located. For example, device 110 and device 115 are located in a same conference room. Device 120 may be located in a different conference room or in a different geographic location than devices 110 and 115. Devices 110-120 are participating in a meeting that is hosted by meeting system 125. One or more other devices not shown in FIG. 2 may also be connected to, e.g., participating in, the meeting. In some cases, for example, tens or hundreds of people participate in a meeting using tens and/or hundreds of devices. Since only a subset of the meeting participants can be displayed during the meeting at any given time, meeting system 125 is capable of determining which video feed from the devices participating in the meeting to display. In one or more embodiments, meeting system 125 displays video from the device(s) that detected an active speaker based upon speaker detection signals 325, 340, and 355.

Continuing with the example, device 110 is muted. Devices 115 and 120 are not muted. The meeting may be a videoconference or a Web-based meeting that includes video. In this example, with device 110 muted, meeting system 125 is unable to determine whether participant A is speaking in the absence of speaker detection signal 325. Without speaker detection signal 325, meeting system 125 is unable to determine whether participant A is an active speaker. By using speaker detection signal 325, arbitration subsystem 305 is capable of determining that participant A is or has become an active speaker despite device 110 being muted. As such, arbitration subsystem 305 is capable of generating active speaker signal 360. Active speaker signal 360 indicates that participant A is the active speaker. In this manner, meeting system 125 is capable of displaying video from device 110 (e.g., showing participant A) regardless of whether device 110 is muted. I/O subsystem 310, for example, is capable of outputting audio and video that displays participant A on each of the output signals (e.g., or data streams) 365, 370, and 375.

The use of speaker detection signals allows meeting system 125 to detect the active speaker without devices 110-120 having to send audio data that may consume significant bandwidth. Sending a score, whether a Boolean value or other type of score, requires less bandwidth than conveying audio. Further, since the speaker detection signals do not convey the actual content of audio that may be detected when the device(s) are muted, the privacy of participants in the meeting is preserved.

In another example, device 110 may not provide audio data 315 to meeting system 125. For example, participant A may have joined the audio of the meeting using another device such as a mobile phone while connecting to the video portion of the meeting using device 110 (e.g., a computer). In this example, device 110 still is able to send speaker detection signal 325 to meeting system 125 thereby allowing meeting system 125 to determine whether participant A is an active speaker without the benefit of receiving any audio from device 110.

Figure 4:
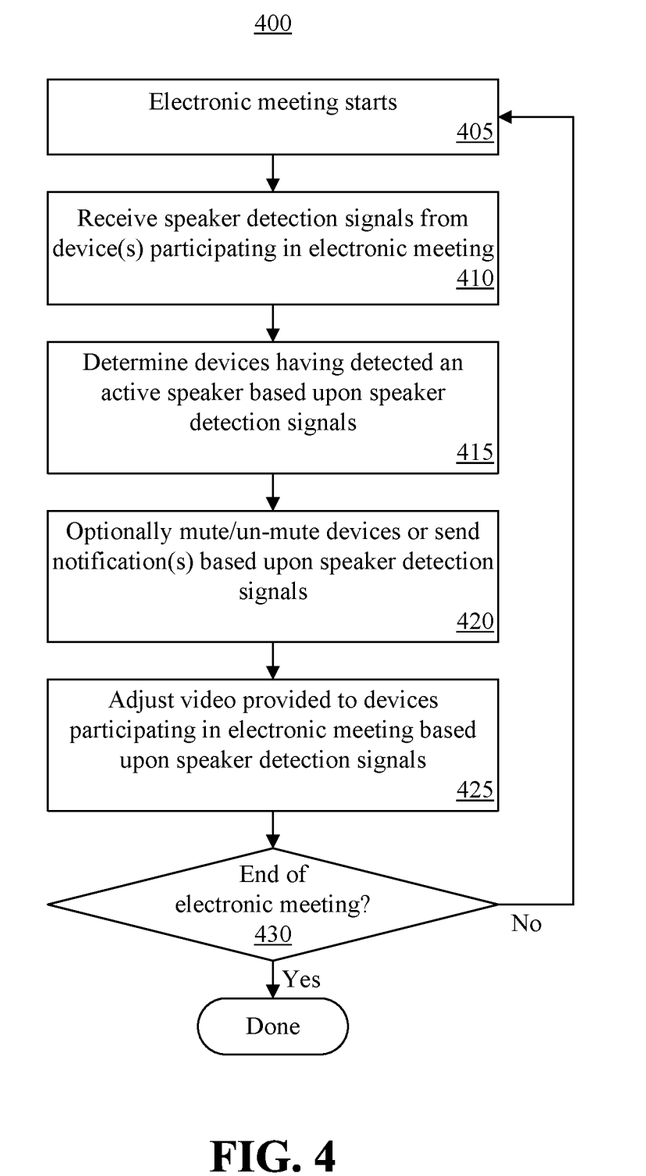
FIG. 4 illustrates an example method of active speaker detection for an electronic meeting system.

FIG. 4 illustrates an example method 400 of active speaker detection for an electronic meeting. Method 400 may be performed by a meeting system as described herein in connection with FIGS. 1, 2, and 3.

Method 400 may begin in block 405 where a meeting starts. For example, the meeting system hosts a meeting that is joined by a plurality of different devices. In block 410, the meeting system receives speaker detection signals from the devices participating in the meeting. In one or more embodiments, each respective device participating in the meeting is capable of sending a speaker detection signal. Each of the respective devices is capable of sending speaker detection signals continuously or periodically throughout the meeting. In one or more embodiments, each device is capable of sending a speaker detection signal providing a real time or substantially real time indication of whether that device has detected an active speaker.

In block 415, the meeting system determines devices having detected an active speaker based upon the speaker detection signals. For example, the meeting system is capable of determining which devices participating in the meeting have detected an active speaker based upon the received speaker detection signal from each respective device.

In particular embodiments, the meeting system is capable of determining whether each respective device has detected an active speaker based upon the received score in the speaker detection signal from the device. In embodiments where the score is a Boolean flag, the meeting system may interpret a value of "1" as indicating an active speaker and a value of "0" as indicating no active speaker detected. In embodiments where the score is not a Boolean flag, the meeting system may compare the score to a predetermined threshold. The meeting system may interpret the score as indicating an active speaker is detected when the score exceeds the predetermined threshold. The meeting system may interpret the score as indicating no active speaker is detected when the score does not exceed the predetermined threshold. Accordingly, in block 415 the system determines which of the devices participating in the meeting have detected an active speaker.

In block 420, the meeting system optionally mutes and/or un-mutes devices and/or sends notifications to mute and/or un-mute devices participating in the meeting based upon the speaker detection signals received from the devices. For example, in one or more embodiments, the meeting system is capable of automatically un-muting a muted device in response to determining that the device has detected an active speaker as indicated by the speaker detection signal from the device. In one or more embodiments, the meeting system is capable of automatically muting an un-muted device in response to determining that the device has not detected an active speaker as indicated by the speaker detection signal from the device.

In one or more embodiments, the meeting system is capable of automatically sending a notification to a muted device indicating that the device should be un-muted in response to determining that the device has detected an active speaker as indicated by the speaker detection signal from the device. In one or more embodiments, the meeting system is capable of automatically sending a notification to an un-muted device indicating that the device should be muted in response to determining that the device has not detected an active speaker as indicated by the speaker detection signal from the device.

In particular embodiments, the meeting system is capable of sending instructions, e.g., executable instructions or commands, to devices participating in the meeting. The instructions may include instructions to mute and/or un-mute the audio (e.g., microphone) of the device. Each device for example may execute a client application that is capable of receiving commands from the meeting system and executing the commands to control, e.g., mute and/or un-mute, a microphone and/or audio subsystem included in the device. The client application within each device may also receive notifications as described and display the notifications to the user of the device.

In particular embodiments, the meeting system is capable muting and/or un-muting audio data within the meeting system instead of controlling the devices. For example, the meeting system is capable of muting and/or un-muting audio data received from devices participating in the meeting so as to include or exclude the audio from a combined audio signal that is generated and provided to devices participating in the meeting. In an aspect, the meeting system is capable of excluding audio data from devices indicating that no active speaker is detected as determined from the speaker detection signals so that the audio data from the devices is not distributed to participants of the meeting. The meeting system, for example, excludes the audio data from devices not detecting an active speaker from the mixed audio data provided to participants of the meeting. In another aspect, the meeting system is capable of including audio data from devices indicating that an active speaker is detected as determined from the speaker detection signals so that the audio data from the devices is distributed to participants of the meeting. The meeting system, for example, includes the audio data from the devices that detect an active speaker in the mixed audio data provided to participants of the meeting.

In block 425, the meeting system is capable of adjusting video distributed to devices participating in the meeting based upon the speaker detection signals. For example, the meeting system is capable of displaying the video received from each device that detects an active speaker as determined from the speaker detection signals. The meeting system is capable of distributing audio and/or video of the active speaker(s) to the respective devices participating in the meeting. In this manner, the meeting system is capable of adjusting the audio and/or video distributed to the devices participating in the meeting on an ongoing and real time or substantially real time basis.

In block 430, the meeting system determines whether the meeting has ended. If so, method 400 may end. If not, method 400 may loop back to block 405 to continue processing as described. Method 400 may continue to iterate as described in real time or substantially real time to continue monitoring the received speaker detection signals and adjusting the video that is distributed to the devices participating in the meeting as described.

The terminology used herein is for the purpose of describing particular embodiments only and is not intended to be limiting. Notwithstanding, several definitions that apply throughout this document now will be presented.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for active speaker detection, comprising:
receiving speaker detection signals from a plurality of devices participating in an electronic meeting, wherein each speaker detection signal specifies a score indicating whether an active speaker is detected by a respective device of the plurality of devices that generates the speaker detection signal; and
determining, using a processor, a device of the plurality of devices that detects an active speaker based upon the speaker detection signals, wherein, in response to the determining, the method further comprises:
providing video received from the determined device to the plurality of devices during the electronic meeting.

2. The method of claim 1, wherein
the speaker detection signals are received separately from audio data or video data received from the plurality of devices.

3. The method of claim 1, wherein
at least two of the devices including the determined device are co-located.

4. The method of claim 1, wherein
the determined device does not send audio data.

5. The method of claim 1, wherein
a microphone of the determined device is muted.

6. The method of claim 1, wherein
the score is a Boolean flag.

7. The method of claim 1, wherein
the speaker detection signals specify only scores.

8. A system for active speaker detection, comprising:
a memory configured to store program code; and
a processor coupled to the memory, wherein
the processor, in response to executing the program code, is configured to initiate operations including:
receiving speaker detection signals from a plurality of devices participating in an electronic meeting, wherein each speaker detection signal specifies a score indicating whether an active speaker is detected by a respective device of the plurality of devices that generates the speaker detection signal; and
determining a device of the plurality of devices that detects an active speaker based upon the speaker detection signals, wherein, in response to the determining, the processor is configured to initiate executable operations comprising:
providing video received from the determined device to the plurality of devices during the electronic meeting.

9. The system of claim 8, wherein
the speaker detection signals are received separately from audio data or video data received from the plurality of devices.

10. The system of claim 8, wherein
at least two of the devices including the determined device are co-located.

11. The system of claim 8, wherein
the determined device does not send audio data.

12. The system of claim 8, wherein
the determined device is muted.

13. The system of claim 8, wherein
the score is a Boolean flag.

14. The system of claim 8, wherein
the speaker detection signals specify only scores.

15. A computer program product for active speaker detection, the computer program product comprising a computer readable storage medium having program instructions embodied therewith, the program instructions executable by a processor to cause the processor to initiate operations comprising:
receiving speaker detection signals from a plurality of devices participating in an electronic meeting, wherein each speaker detection signal specifies a score indicating whether an active speaker is detected by a respective device of the plurality of devices that generates the speaker detection signal; and
determining a device of the plurality of devices that detects an active speaker based upon the speaker detection signals, wherein, in response to the determining, the processor is configured to initiate executable operations comprising:
providing video received from the determined device to the plurality of devices during the electronic meeting.

16. The computer program product of claim 15, wherein
the speaker detection signals are received separately from audio data or video data received from the plurality of devices.

17. The computer program product of claim 15, wherein
the determined device does not send audio data or has a microphone that is muted.

* * * * *